(12) United States Patent
Villaret (10) Patent No.: US 8,492,704 B2
(45) Date of Patent: Jul. 23, 2013

(54) ENCODER AND METHOD OF PRECISELY INDICATING POSITIONS OF ONE MEMBER RELATIVE TO A SECOND MEMBER

(75) Inventor: Yves Villaret, Hadera (IL)

(73) Assignee: Yaskawa Europe Technology Ltd., Rosh HaAyin (IL)

( * ) Notice: Subject to any disclaimer, the term of this patent is extended or adjusted under 35 U.S.C. 154(b) by 614 days.

(21) Appl. No.: 12/601,836

(22) PCT Filed: May 28, 2008

(86) PCT No.: PCT/IL2008/000719
§ 371 (c)(1),
(2), (4) Date: Nov. 25, 2009

(87) PCT Pub. No.: WO2008/146282
PCT Pub. Date: Dec. 4, 2008

(65) Prior Publication Data
US 2010/0140463 A1   Jun. 10, 2010

(30) Foreign Application Priority Data

May 28, 2007  (IL) .......................... 183471

(51) Int. Cl.
*G01D 5/34* (2006.01)
(52) U.S. Cl.
USPC ...................... 250/231.14; 341/9
(58) Field of Classification Search
USPC .... 250/231.13–231.18, 237 G, 237 R; 341/9, 341/13; 356/615–617
See application file for complete search history.

(56) References Cited

U.S. PATENT DOCUMENTS 5,068,529 A * 11/1991 Ohno et al. .............. 250/231.18
5,138,560 A   8/1992 Lanfer et al.

FOREIGN PATENT DOCUMENTS

| DE | 19506019 | 9/1996 |
| EP | 0377097 | 7/1990 |
| WO | WO 96/19872 | 6/1996 |
| WO | WO 2008/146282 | 12/2008 |

OTHER PUBLICATIONS

Office Action Dated Dec. 11, 2008 From the Israeli Patent Office Re.: Application No. 183471.

(Continued)

*Primary Examiner* — Francis M Legasse, Jr.

(57) ABSTRACT

An encoder and method for precisely indicating the position of a first member with respect to a second member by utilizing a pattern of machine-sensible elements carried on a single track of the first member; the machine-sensible elements being located at successive incremental rotations on the track of the first member and each representing one of the binary values "0" and "1"; and a plurality of "n" sensors, wherein "n" is greater than "3", carried by the second member at a plurality of spaced locations thereon in proximity to the track of the first member and alignable with the machine-sensible elements of the first member. Each sensor thus senses the binary value of each machine-sensible element with which it is aligned to produce an output corresponding to the binary value of the machine-sensible element with which it is aligned, whereby the outputs of all the sensors constitute a binary code, preferably a Gray code, of "n" bits identifying the position of the first member with respect to the second member.

19 Claims, 4 Drawing Sheets

OTHER PUBLICATIONS

International Search Report Dated Apr. 28, 2009 From the International Searching Authority Re.: Application No. PCT/IL2008/000719.

Written Opinion Dated Apr. 28, 2009 From the International Searching Authority Re.: Application No. PCT/Il2008/000719.

Noting of Loss of Rights Pursuant to Rule 112(1) EPC Dated Dec. 17, 2010 From the European Patent Office Re. Application No. 08751401.4.

Response Dated Feb. 16, 2011 to Noting of Loss of Rights Pursuant to Rule 112(1) EPC of Dec. 17, 2010 From the European Patent Office Re. Application No. 08751401.4.

Communication Under Art. 113 EPC, Request for Re-Establishment of Rights (Art. 122 EPC) Dated Apr. 18, 2012 From the European Patent Office Re. Application No. 08751401.4.

Communication Pursuant to Article 94(3) EPC Dated Sep. 24, 2012 From the European Patent Office Re. Application No. 08751401.4.

* cited by examiner

| | |
|---|---|
| a → | read the number of sectors p and sensors n |
| b → | set equally distributed sectors as "sensed sectors" |
| c → | create a random pattern |
| d → | calculate a first code |
| e → | change sensed sectors to next sectors |
| f → | calculate a second code |
| g → | compare bits of codes |
| h → | if codes differ by more than one bit, change Boolean value |
| i → | repeat steps d to h until no more than one differing bit is found |
| j → | attribute to all codes from 0 to $2^n$ a value 0 |
| k → | calculate a first code, according to the sensed sectors |
| l → | increment value attributed to that code by one |
| m → | if value attributed to that code is greater than one, go to step (c) to try |
| n → | repeat steps (i) to (m) p times (loop if step (m) did not exit) |
| o → | output found pattern |

Fig. 4

ENCODER AND METHOD OF PRECISELY INDICATING POSITIONS OF ONE MEMBER RELATIVE TO A SECOND MEMBER

RELATED APPLICATIONS

This Application is a National Phase of PCT Patent Application No. PCT/IL2008/000719 having International filing date of May 28, 2008, which claims the benefit of Israel Patent Application No. 183471 filed on May 28, 2007. The contents of the above Applications are all incorporated herein by reference.

FIELD AND BACKGROUND OF THE INVENTION

The present invention relates to an encoder and method for precisely indicating the position of a first member with respect to a second member. The invention is particularly useful for optical encoders, and is therefore described below with respect to such an application, but it will be appreciated that it could also be used with respect to non-optical encoders, such as brush-and-slipring encoders and magnetic encoders.

An encoder of the common type is an electro-mechanical device coupled to a moving member, for example a rotating shaft or a linearly sliding member, that produce an electronic signal which can be processed to provide information regarding the position of the moving member, i.e. the rotation angle of the shaft, or the linear position of the sliding member.

Encoders may be of the incremental or absolute type. An incremental encoder provides information about the rotation angle relative to the initial position, i.e. the position of the moving member at the time the encoder was activated. Absolute encoders give absolute position information, not depending on the initial position at activation time.

Absolute rotary encoders can be classified into single turn absolute and multi-turn absolute rotary encoders. Single turn absolute rotary encoders provide shaft angle information modulo one turn, while multi-turn rotary absolute encoders provide shaft angle information including the number of turns executed by the shaft, starting at a time origin such as encoder manufacturing time.

Similarly, absolute linear encoders of a first type provide position information modulo a given linear period. This kind of linear encoder is used for example with linear motors, in order to provide motor magnetic pole position information relative to the moving coils, allowing brushless commutation by the motor controller. A second type of absolute linear encoder provides position information relative to a constant absolute origin.

Figure 1:
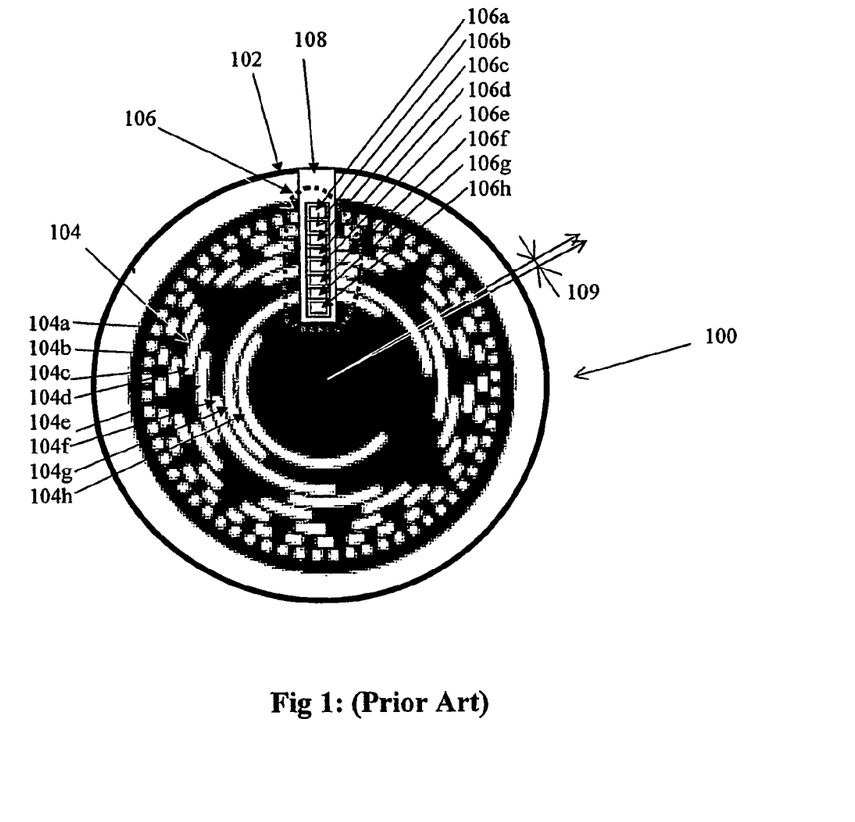
FIG. 1 illustrates a rotary encoder of the prior art, including a plurality of concentric tracks and a plurality of sensors, as briefly described above.

Typically, in a single turn absolute rotary encoder of the prior art, a pattern of circular tracks consisting of sections with different optical properties is applied on a disc fixed to a rotating shaft. Such optical property may be the transparency (light transmissivity or light non-transmissivity) of a section. An example of a prior art disc is shown in FIG. 1, whereas each circular track on the disc is provided with an optical sensor and is scanned by light rays such that each sensor will output a signal representing the optical property of the section of pattern facing it at a given point of time.

The signal output by the sensor is a binary "0" or "1" signal (bit). These bit signals are combined to create a binary code which is dependent on the rotation angle of the disc, and the code is then converted to position information according to a predefined table.

Typically, special patterns giving rise to special types of code (Gray code) are used. As known in the art, the term Gray code refers to a code for which only one bit of the code is changed between two consecutive increments of the encoder disc. This type of code prevents the creation of an erroneous code at transitions between increments.

A disadvantage of prior art encoders of the type described above is that several concentric tracks are required for providing information regarding the position of the moving member. Since each track requires a minimum area for reasonable precision, the total size of the disc is undesirably large. For example, the disc pattern shown in FIG. 1 has eight concentric tracks and the track with the smallest diameter must have the same angular precision as the one with the largest diameter, such that dimension tolerance becomes very low. Consequently in the prior art encoders, the minimum possible encoder disc size is limited, whereby manufacturing costs are increased.

A number of attempts have been made to reduce the minimum number of tracks. Patent Application Publication EP 0-332-244-A1 shows an arrangement where only two tracks are used, a coding track and a so called "Clock" track. However, this patent still requires two tracks, and the code created is not a Gray code, i.e. for two adjacent increments, there are positions where more than one bit of the "clock" track is changed.

PCT WO 91/00984 by Nagase and Higashi describes a one track absolute code system. However this patent requires that a number "n" of sensors be placed at "n" consecutive increments. The sensors then must be very small, so that they can be placed next to each other. This requires the manufacturing of a specially designed opto-electronic chip. Such a chip must be designed for each particular encoder size, and thus cannot be used for several types of encoders of different sizes.

Another known technique employs a single track with three sensors that provides six codes for six increments. This technique is widely used with brushless servo motors to retrieve position information about the rotor pole in which case Hall sensors are commonly used to sense the magnetic poles of the rotor. However this technique is only applicable with three sensors, and position information resolution has but six values.

OBJECTS AND BRIEF SUMMARY OF THE PRESENT INVENTION

An object of the present invention is to provide an encoder having advantages in one or more of the above respects. In particular, an object of the invention is to provide an encoder requiring but a single track and capable of accommodating more than three sensors in spaced relationship to each other for precisely indicating the position of a first member with respect to a second member. A further object of the invention is provide an encoder that produces a binary output based on the Gray code, wherein each incremental movement of the moving member changes the binary value of only one of the bits in the binary code outputted by the sensors.

According to one aspect of the present invention, there is provided an encoder for precisely indicating the position of a first member with respect to a second member, comprising: a pattern of machine-sensible elements carried on a track of the first member; the machine-sensible elements being located at successive incremental locations on the track of the first member and each representing one of the binary values "0" and "1"; and a plurality of "n" sensors, carried by the second member at a plurality of spaced locations thereon in proximity to the track of the first member and alignable with the machine-sensible elements of the first member; characterized in that said pattern of machine-sensible elements is carried by a single track of said first member, and in that the number "n" of sensors carried by said second member is greater than "3", such that each sensor senses the binary value of each machine-sensible element with which it is aligned to produce an output corresponding to the binary value of the machine-sensible element with which it is aligned, whereby the outputs of all the sensors constitute a binary code of "n" bits identifying the position of the first member with respect to the second member.

Preferably, the pattern of machine-sensible elements carried on the track of the first member, and the spacing of the sensors carried by the second member with respect to the track on the first member create a Gray code; that is, they are such that each incremental movement of the first member changes the binary value of only one of the bits of the binary numbers outputted by the sensors.

According to further features in the described preferred embodiments, "n" is between "4" and "10", and the successive incremental locations of the machine-sensible elements on the track are less in number than "$2^n$". In one described preferred embodiment, there are seven sensors and 98 incremental positions of the moveable member, which can be indicated by the seven-bit binary code outputted by the sensors.

As indicated earlier, the invention is particularly useful with respect to optical encoders. Therefore, according to another aspect of the present invention, there is provided an optical encoder for precisely indicating the position of a first member with respect to a second member, comprising: a pattern of optical elements carried on a track of the first member; the optical elements being located at successive incremental locations on the track of the first member and each representing one of the binary values "0" and "1"; and a plurality of "n" optical sensors, wherein "n" is greater than "3", carried by the second member at a plurality of spaced locations thereon in proximity to the track of the first member and alignable with the optical elements of the first member, characterized in that said pattern of optical elements is carried by a single track of said first member, and in that the number "n" of sensors carried by said second member is greater than "3", such that each optical sensor senses the binary value of each optical element with which it is aligned to produce an output corresponding to the binary value of the optical element with which it is aligned, whereby the outputs of all the optical sensors constitute a binary code of "n" bits identifying the position of the first member with respect to the second member; the pattern of optical elements carried on the single track on the first member, and the spacing of the optical sensors carried by the second member with respect to the single track of the first member, being such that each incremental movement of the first member changes the binary value of only one of the bits of the binary code outputted by the optical sensors.

According to a further aspect of the present invention, there is provided a method of precisely indicating the position of a first member with respect to a second member, comprising: providing a pattern of machine-sensible elements carried on a track of the first member; the machine-sensible elements being located at successive incremental rotations on the track of the first member and each representing one of the binary values "0" and "1"; and providing a plurality of "n" sensors, carried by the second member at a plurality of spaced locations thereon in proximity to the track of the first member and alignable with the machine-sensible elements on the first member; characterized in that said pattern of machine-sensible elements is carried by a single track of said first member, and in that the number "n" of sensors carried by said second member is greater than "3", such that each sensor senses the binary value of each machine-sensible element with which it is aligned to produce an output corresponding to the binary value of the machine-sensible element with which it is aligned, whereby the outputs of all the sensors constitute a binary code of "n" bits identifying the position of the first member with respect to the second member; outputting a one bit signal from each sensor in accordance with the machine-sensible element with which the respective sensor is aligned; combining the bits from all the sensors into a binary number; and processing the binary number into information indicating the position of the first member with respect to the second member.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

The Prior Art Rotary Encoder of FIG. 1

The prior art encoder illustrated in FIG. 1 is a rotary optical encoder including a disc 100 to be fixed on a rotating shaft (not shown) to be rotated with respect to a fixed member 102, and carrying a pattern of machine-sensible elements, in the form of optical elements 104, to be sensed by optical sensors 106 in order to precisely indicate the position of the rotary shaft with respect to the fixed member 102. The optical elements 104 are located on a plurality of concentric tracks. They are shown as white sections representing light-transmissive (e.g. transparent) elements, and black sections representing light non-transmissive (e.g. absorbent or reflective) elements. As shown in FIG. 1, the optical elements 104 are arrayed in eight concentric circular arrays 104a-104h.

The group of optical sensors, generally designated 106, are fixably carried by the fixed member 102 as schematically shown by the mechanical connections 108. There are eight sensors 106a-106h arrayed in a radial line so as to be aligned with each of the concentric circles 104a-104h of the optical elements 104. Each sensor 106a-106h is thus located such as to detect the optical property of the optical element 104a-104h aligned with the respective sensor at any instant to output a binary signal according to the optical property of the respective optical element. For example, a light-transmissive element may be represented by a "1", and a light non-transmissive element may be represented by a "0".

The combination of the eight binary signals outputted by the eight sensors 106a-106h at any instant thus results in a binary code which is unique for each incremental position of the optical disc 100. In the example illustrated in FIG. 1, the eight concentric circles of optical elements 104 define 256 incremental positions of the optical disc 100, each incremental position being defined by the sector angle 109 between two radial lines extending through the same fiducial point of two adjacent optical elements.

A particular property of the pattern of FIG. 1 is that the code is a "Gray code", i.e. the codes of two adjacent sectors differ only by only one bit. This allows the reading of the code to be well defined at transitions between adjacent sectors, even if there is some imprecision in the pattern. This use of the Gray code for an encoder is a known technique.

The main disadvantage of the encoder using the pattern of FIG. 1 is that the pattern is distributed on several concentric tracks. Each track has a minimum width and a minimum radius in order to achieve the required precision. Therefore, to achieve the desired precision, the disc must have a radius greater than the minimum radius plus the minimum width multiplied by the number of tracks, resulting in an encoder of relatively large size.

The Present Invention

General

The novel encoder, as described below, enables the moveable member, whose position is to be precisely located, to include but a single track of optical, or other machine-sensible sensible, elements cooperable with a plurality of optical, or other types of, sensors spaced around the single track. The novel construction thus provides a number of important advantages, including a much smaller size of the encoder, and a lower production cost because of its smaller size and simpler pattern. The production cost is also substantially lowered because the encoder is capable of utilizing sensors of the standard opto-electronic devices since the sensors are spaced from each other and therefore may be of standard sizes. A further important advantage is that the novel encoder enables a much higher precision in the determination of the position of the moveable member since it enables the moveable member to be divided into a large number of increments of movement.

Figure 2:
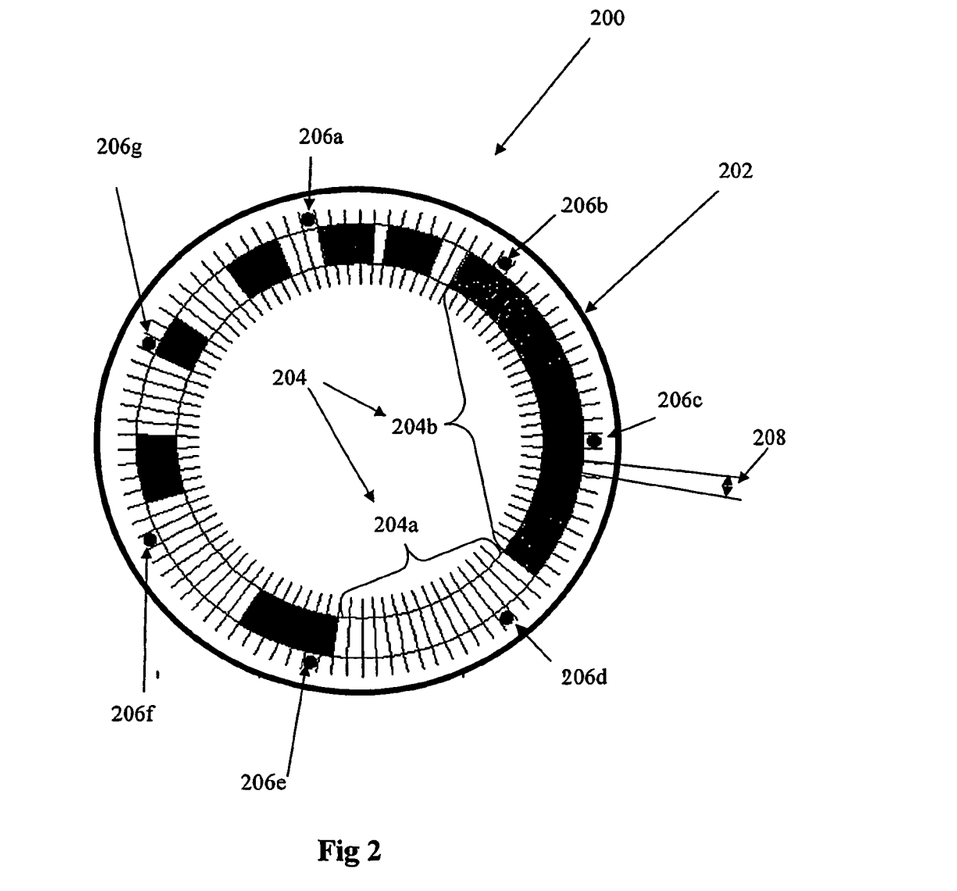
FIG. 2 illustrates a rotary encoder constructed in accordance with the present invention to include a single circular track and a plurality of angularly-spaced sensors.
Figure 3:
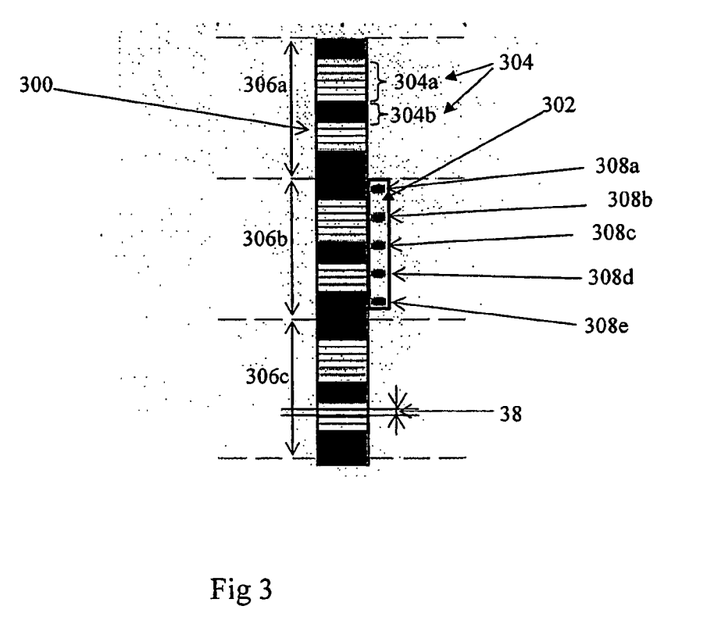
FIG. 3 illustrates a linear encoder constructed in accordance with the present invention including a single linear track and a plurality of linearly-spaced sensors.

Two preferred embodiments of the invention are described below for purposes of example. The first embodiment illustrated in FIG. 2 is in the form of a rotary encoder; and the second embodiment, illustrated in FIG. 3, is in the form of a linear encoder. In both cases, the machine-sensible elements are optical elements, and the sensors are optical sensors, but it will be appreciated that the invention could be implemented in other types of encoders, such as those using brushes and sliprings, electromagnetic elements, etc.

The Optical Encoder of FIG. 2

FIG. 2 illustrates a rotary optical encoder wherein the pattern of machine-sensible (optical) elements are carried on a single track rotary member or disc 200 divided into a large number (98 in this case) of incremental positions or sectors, cooperable with a group of seven sensors carried by a fixed member 202, and spaced around the circular track of optical elements.

Thus, as seen in FIG. 2, the optical elements designated 204 are constituted of a plurality of light-transmissive elements 204a and a plurality of light non-transmissive elements 204b arrayed in a single circular track around the circumference of the optical disc 200. The optical sensors, generally designated 206, are constituted of seven sensors arrayed in a circular array, as shown at 206a-206f, in proximity to the optical elements 204 such that for each incremental position or section of the optical disc 200, each of the sensors 206a-206g is in alignment with one of the optical elements 204 so as to sense the binary value represented by the respective optical element.

It will thus be seen that for each incremental position or sector of the optical disc 200, seven sensors 206a-206g will output a binary bit (0 or 1) representing the optical property of the optical element with which each sensor is aligned. Thus, for each incremental position (sector) of the optical disc, a seven-bit binary code will be outputted by the sensors to indicate that position.

As further seen in FIG. 2, the seven sensors 206a-206g are equally spaced from each other, thereby allowing standard optical sensors to be used. In the example illustrated in FIG. 2, the optical disc 200 is divided into 98 incremental positions (sectors) 208, each occupied by an optical element 204 (either a light-transmissive element 204a or a light non-transmissive element 204b); and each of the seven sensors 206a-206f is spaced from each other a distance of 14 incremental positions (sectors).

The encoder construction illustrated in FIG. 2 not only provides the advantages of a more compact construction, a more precise determination of the position of the rotary disc, and the permissible use of larger, commercially-available sensors, but also the further advantage of producing a binary output in the form of a Gray code. As indicated above, in the Gray code, two adjacent incremental positions (sectors) differ only by one bit such that each incremental movement of the rotary disc changes the outputted binary value of only one bit of the seven-bit binary code outputted by the sensors. As further indicated above, the Gray code allows the reading of the code to be well defined at transitions between adjacent incremental positions even if there is some imprecision in the pattern.

While the embodiment illustrated in FIG. 2 illustrated 98 incremental positions, and seven sensors, it will be appreciated that the invention could be implemented with a larger or smaller number of incremental positions, and with a larger or smaller number of sensors. The number of incremental positions (p) should always be less than the number "2" raised to the number (n) of sensors, i.e.:

$$p < 2^n$$

Patterns based on the Gray code using several tracks, as shown in FIG. 1, are able to provide a greater number of sectors (incremental positions):

$$p = 2^n$$

However, in order to provide this greater number of sectors (p), several tracks must be used, so that a larger diameter of the pattern is required as pointed out above. On the other hand, the smaller number of sectors (p) provided by the pattern of this invention is considerably compensated for by the fact that only one track is required, thereby enabling the use of standard sensors, and a reduction in the precision requirements for the mechanical mounting of the sensors.

In order to find the patterns according to this invention, a computer program can be used to search for patterns that verify the required conditions:

1) the resulting code is a Gray code; and
2) there is only one code for each sector (incremental position).

Figure 4:
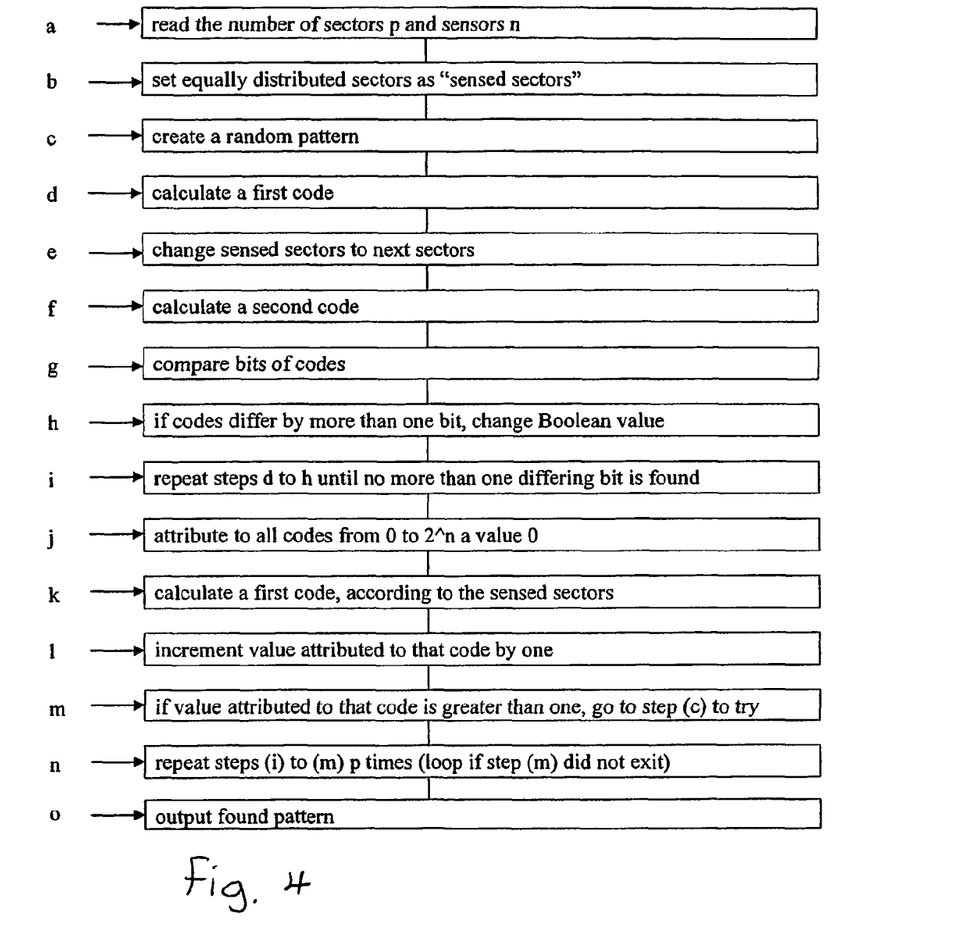
FIG. 4 is a block diagram illustrating one example of a computer program for determining the pattern of machine-sensible elements (e.g., optical elements) in accordance with the present invention.

The principle of such a computer program is shown and exemplified by the steps illustrated in the block diagram of FIG. 4:

(a) read the number of sectors p and sensors n;
(b) set equally distributed sectors as the "sensed sectors", representing sectors the properties of which are sensed by the sensors for an initial position of the encoder disc;
(c) create a random pattern, attributing randomly to each sector one Boolean value, representing a physical property of the sector;
(d) calculate a first code, according to the Boolean values of the sensed sectors;
(e) change sensed sectors to next sectors, in a predefined direction;
(f) calculate a second code;
(g) compare bits of codes;
(h) if codes differ by more than one bit, change Boolean value attributed to sensed sector for all differing bits except one;
(i) repeat steps (d)-(h) until no more than one differing bit is found between first and second code for at least p consecutive times;
(j) attribute to all codes from 0 to 2^n a value 0;
(k) calculate a first code, according to the sensed sectors;
(l) increment the value attributed to that code by one;
(m) if the value attributed to that code is greater than one, go to step (c) to try a new pattern;
(n) repeat steps (i) to (m) p times (loop if step (m) did not exit); and
(o) output the found pattern.

Steps (a) and (b) are initialization steps; steps (c)-(h) create a Gray code; steps (j)-(m) set the code for one unique code per sector (incremental position); and the remaining steps (n) and (o) produce an output of the found pattern.

It will be appreciated that other programs and optimizations can be used to find the patterns suitable for the novel coder according to each particular application.

The Linear Encoder of FIG. 3

FIG. 3 illustrates the invention implemented in a linear encoder wherein the plurality of machine-sensible elements, in this case also optical elements, are carried on a single linear track on the moveable member 300, and the sensors, optical sensors, are fixed in a linear array on the fixed member 302.

Thus, as shown in FIG. 3, the machine-sensible elements 304 on moveable member 300 are also optical elements of light-transmissive and light non-transmissive elements, but are arrayed in a straight line. They are divided into three similar periods, shown at 306a, 306b and 306c, respectively, each period being constituted of 20 incremental positions (sectors) 38

Fixed member 302 carries five sensors 308a-308e also arrayed in a single line and spaced equally from each other. In the initial position of the moveable member 300 with respect to the fixed member 302, the array of five sensors 308a-308e are located within one period of the optical elements, namely the middle period 306b as shown in FIG. 3.

It will thus be seen that the pattern illustrated in FIG. 3 is linear and periodic. Each of the periods 306a-306c can be regarded as a "spread out" pattern of the rotary encoder illustrated in FIG. 2.

In the preferred embodiment of equally distributed sensors, the position modulo one period is considered. In that case the term "equally distributed" for n sensors, means that the sensed positions x(i) by sensors i verify the relations $$[(x(i+1)-x(i)) \bmod L] = \pm L/n, \text{ for all } i \text{ from 1 to } n$$

where L is the length of one period of the pattern.

While the invention has been described with respect to two preferred embodiments, it will be appreciated that these are set forth merely for purposes of example, and that many variations may be made. For example, instead of having one member moveable and the other fixed, the two members could be moveable with respect to each other. In addition, the number of incremental positions can be increased or decreased as desired for the particular application, with the number of sensors appropriately increased or decreased. Further, other machine-sensible elements and sensors may be used, as indicated above. Moreover, in the linear encoded embodiment of FIG. 3, a smaller or larger number of periods could be used, the number of sensors could be different, and the positioning of the sensors may also be different.

Many other variations, modifications and applications of the invention will be apparent.

What is claimed is:

1. An encoder for precisely indicating the position of a first member with respect to a second member, comprising:
   a pattern of machine-sensible elements carried on a single track of said first member; said machine-sensible elements being located at successive incremental locations on said single track of said first member and each representing one of the binary values "0" and "1";
   and a plurality of "n" sensors, carried by said second member at a plurality of spaced locations thereon in proximity to said single track of said first member and alignable with said machine-sensible elements of said first member;
   characterized in that said pattern of machine-sensible elements is carried by a single track of said first member, and in that the number "n" of sensors carried by said second member is greater than "3", such that each sensor senses the binary value of each machine-sensible element with which it is aligned to produce an output corresponding to the binary value of the machine-sensible element with which it is aligned, whereby the outputs of all the sensors constitute a binary code of "n" bits identifying the position of said first member with respect to said second member, and wherein said pattern of machine-sensible elements carried on said track of the first member, and the spacing of said sensors carried by said second member with respect to said track on the first member, are such that each incremental movement of said first member changes the binary value of only one of said bits of the binary numbers outputted by said sensors.

2. The encoder according to claim 1, wherein said machine-sensible elements are optical elements of two different optical properties; and wherein said sensors are optical sensors.

3. The encoder according to claim 1, wherein "n" is between "4" and "10", and wherein said successive incremental locations of the machine-sensible elements on said track are less in number than "2^n".

4. The encoder according to claim 1, wherein said plurality of machine-sensible elements are divided into a plurality of groups, each group including a plurality of consecutive sensible elements representing one binary value, and separated by a plurality of consecutive sensible elements representing the other binary value.

5. The encoder according to claim 1, wherein:
said first member is a rotary member;
said track is a single circular track on said rotary member;
and said plurality of "n" sensors are in the form of a circular array carried on said second member.

6. The encoder according to claim 1, wherein:
said first member is a linearly-moveable member;
said track is a single linear track;
and said plurality of "n" sensors are in the form of a linear array carried on said second member.

7. The encoder according to claim 2, wherein said two different optical properties of the optical elements are light transmissivity and light non-transmissivity.

8. The encoder according to claim 6, wherein said pattern of machine-sensible elements are divided into a plurality of periods, and wherein said sensors are equally spaced from each other in a single group initially extending within one of said periods.

9. An optical encoder for precisely indicating the position of a first member with respect to a second member, comprising:
a pattern of optical elements carried on a single track of said first member; said optical elements being located at successive incremental locations on said single track of said first member and each representing one of the binary values "0" and "1";
and a plurality of "n" optical sensors, carried by said second member at a plurality of spaced locations thereon in proximity to said track of said first member and alignable with said optical elements of said first member;
characterized in that said pattern of optical elements is carried by a single track of said first member, and in that the number "n" of sensors carried by said second member is greater than "3", such that each optical sensor senses the binary value of each optical element with which it is aligned to produce an output corresponding to the binary value of the optical element with which it is aligned, whereby the outputs of all the optical sensors constitute a binary code of "n" bits identifying the position of said first member with respect to said second member;
said pattern of optical elements carried on said single track of the first member, and the spacing of said optical sensors carried by said second member with respect to said single track on the first member, being such that each incremental movement of said first member changes the binary value of only one of said bits of the binary code outputted by said optical sensors.

10. The optical encoder according to claim 9, wherein said two different optical properties of the optical elements are light transmissivity and light non-transmissivity.

11. The optical encoder according to claim 9, wherein said plurality of optical elements are divided into a plurality of groups, each group including a plurality of consecutive optical elements representing one binary value, and separated by a plurality of consecutive optical elements representing the other binary value.

12. The optical encoder according to claim 9, wherein:
said first member is a rotary member;
said single track is a circular track on said rotary member;
and said plurality of "n" optical sensors are in the form of a circular array carried on said second member.

13. The optical encoder according to claim 9, wherein:
said first member is a linearly-moveable member;
said single track is a linear track;
and said plurality of "n" optical sensors are in the form of a linear array carried on said second member.

14. The optical encoder according to claim 10, wherein "n" is between "4" and "10", and wherein said successive incremental locations of the optical elements on said single track are less in number than "$2^n$".

15. The optical encoder according to claim 13, wherein said pattern of optical elements are divided into a plurality of periods, and wherein said optical sensors are equally spaced from each other in a single group initially extending within one of said periods.

16. The method of precisely indicating the position of a first member with respect to a second member, comprising:
providing a pattern of machine-sensible elements carried on a single track of said first member; said machine-sensible elements being located at "p" successive incremental locations on said single track of said first member and each representing one of the binary values "0" and "1";
and providing a plurality of "n" sensors, carried by said second member at a plurality of spaced locations thereon in proximity to said track of said first member and alignable with said machine-sensible elements on said first member;
characterized in that said pattern of machine-sensible elements is carried by a single track of said first member, and in that the number "n" of sensors carried by said second member is greater than "3", such that each sensor senses the binary value of each machine-sensible element with which it is aligned to produce an output corresponding to the binary value of the machine-sensible element with which it is aligned, whereby the outputs of all the sensors constitute a binary code of "n" bits identifying the position of said first member with respect to said second member;
wherein said pattern of machine-sensible elements carried on said track of the first member, and the spacing of said sensors carried by said second member with respect to said track of the first member, are such that each incremental movement of said first member changes the binary value of only one of said bits of the binary numbers outputted by said sensors
outputting a one bit signal from each sensor in accordance with the machine-sensible element with which the respective sensor is aligned;
combining the bits from all the sensors into a binary number;
and processing said binary number into information indicating the position of the first member with respect to the second member.

17. The method according to claim 16, programming a computer to perform the following steps:
a. read the number of incremental locations p and sensors n;
b. set equally distributed incremental location for the machine-sensible elements which are sensed by the sensors for an initial position of the first member;
c. create a random pattern, attributing randomly to each sensed element one Boolean value, representing a physical property of the respective incremental location;
d. calculate a first code, according to the Boolean values of the sensed elements;
e. change sensed elements to the next incremental location in a predefined direction;

f. calculate a second code;
g. compare the bits of the codes;
h. if the codes differ by more than one bit, change the Boolean value attributed to the sensed elements for all differing bits except one;
i. Repeat steps (d)-(h) until no more than one differing bit is found between first and second code for at least p consecutive time;
j. attribute to all codes from 0 to $2^n$ a value 0;
k. calculate a first code, according to the sensed elements;
l. increment the value attributed to that code by one;
m. if the value attributed to that code is greater than one, go to step 3 to try a new pattern;
n. Repeat steps (i) to (m) p times (loop if step (m) did not exit); and
o. output the found pattern.

18. The method according to claim 16, wherein:
said first member is a rotatable member;
said track is a single circular track;
and said plurality of "n" sensors are in the form of a circular array carried on said second member.

19. The method according to claim 16, wherein:
said first member is a linearly-moveable member;
said track is a single linear track;
and said plurality of "n" sensors are in the form of a linear array carried on said second member.

* * * * *